(12) United States Patent
Freed et al.

(10) Patent No.: US 8,739,426 B1
(45) Date of Patent: Jun. 3, 2014

(54) MEASURING DEVICE

(76) Inventors: Jeffory D. Freed, West Des Moines, IA (US); Herbert O. Dixon, Jr., Adel, IA (US); Burton D. Johnson, Urbandale, IA (US); Jonathan F. Freed, West Des Moines, IA (US)

( * ) Notice: Subject to any disclaimer, the term of this patent is extended or adjusted under 35 U.S.C. 154(b) by 156 days.

(21) Appl. No.: 13/323,036

(22) Filed: Dec. 12, 2011

Related U.S. Application Data

(60) Provisional application No. 61/427,988, filed on Dec. 29, 2010.

(51) Int. Cl.
*G01B 3/10* (2006.01)

(52) U.S. Cl.
USPC .................. 33/756; 33/413; 33/763

(58) Field of Classification Search
USPC .......... 33/756, 413, 755, 761, 762, 763, 1 PT
See application file for complete search history.

(56) References Cited

U.S. PATENT DOCUMENTS

| | | | | |
|---|---|---|---|---|
| 9,496 | A * | 12/1852 | Woodworth | 33/756 |
| 3,170,240 | A * | 2/1965 | Collins | 33/763 |
| 4,316,081 | A * | 2/1982 | Washizuka et al. | 377/18 |
| 4,532,709 | A * | 8/1985 | Leumann et al. | 33/763 |
| 4,575,944 | A * | 3/1986 | Lin | 33/762 |
| 4,587,738 | A * | 5/1986 | Kang | 33/762 |
| 4,644,659 | A * | 2/1987 | Takahama | 33/1 T |
| 5,894,678 | A | 4/1999 | Masreliez et al. | |
| 5,983,514 | A | 11/1999 | Lindsey | |
| 6,154,975 | A * | 12/2000 | Steinich | 33/756 |
| 6,341,426 | B1 * | 1/2002 | Okumura | 33/1 PT |
| 6,868,620 | B2 * | 3/2005 | Sanoner | 33/763 |
| 6,877,245 | B2 * | 4/2005 | Brohammer | 33/756 |
| 7,103,988 | B2 | 9/2006 | Sanoner | |
| 7,451,552 | B2 | 11/2008 | Haglof | |
| 7,708,658 | B2 | 5/2010 | McInerney | |
| 2002/0088136 | A1 * | 7/2002 | Tseng | 33/762 |
| 2009/0313844 | A1 * | 12/2009 | Swanson et al. | 33/756 |
| 2011/0078914 | A1 | 4/2011 | Swanson | |

* cited by examiner

*Primary Examiner* — Christopher Fulton
(74) *Attorney, Agent, or Firm* — Zarley Law Firm, P.L.C.

(57) ABSTRACT

A measuring device for providing a portable and easy-to-use electronic measuring device. The measuring device generally includes a housing which includes a locking member, a reel member, a sensing assembly and control unit. A length of string is wound around the reel member, which is secured within the housing in a manner which allows the string to be retracted around the reel member absent outside force. As the string is dispensed through a string opening on the housing, a sensor wheel having a plurality of counting indicia will be rotated underneath one or more sensing members, which act to calculate the distance of string which has been dispensed. This data is communicated to a control unit, which causes the relevant information to be shown on a display on the housing. The locking member may be utilized to stop the string from being dispensed after the requisite length has been dispensed.

16 Claims, 4 Drawing Sheets

MEASURING DEVICE

CROSS REFERENCE TO RELATED APPLICATIONS

I hereby claim benefit under Title 35, United States Code, Section 119(e) of U.S. provisional patent application Ser. No. 61/427,988 filed Dec. 29, 2010. The 61/427,988 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a measuring device and more specifically it relates to a measuring device for providing a portable, cost-efficient and easy-to-use electronic measuring device.

2. Description of the Related Art

Any discussion of the related art throughout the specification should in no way be considered as an admission that such related art is widely known or forms part of common general knowledge in the field.

Measuring devices such as tape measures have been in use for years. In the past, such measuring devices have generally included a tape or string which includes indicia thereon for indicating the length of tape or string which has been dispensed. Existing electronic tape measures are often very difficult to use, bulky and expensive. Because of the inherent problems with the related art, there is a need for a new and improved measuring device for providing a portable, cost-efficient and easy-to-use electronic measuring device.

BRIEF SUMMARY OF THE INVENTION

The invention generally relates to a measuring device which includes a housing which includes a locking member, a reel member, a sensing assembly and a control unit. A length of string is wound around the reel member, which is secured within the housing in a manner which allows the string to be retracted around the reel member absent outside force. As the string is dispensed through a string opening on the housing, a sensor wheel having a plurality of counting indicia will be rotated underneath one or more sensing members, which act to calculate the distance of string which has been dispensed. This data is communicated to a control unit, which causes the relevant information to be shown on a display on the housing. The locking member may be utilized to stop the string from being dispensed after the requisite length has been dispensed.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
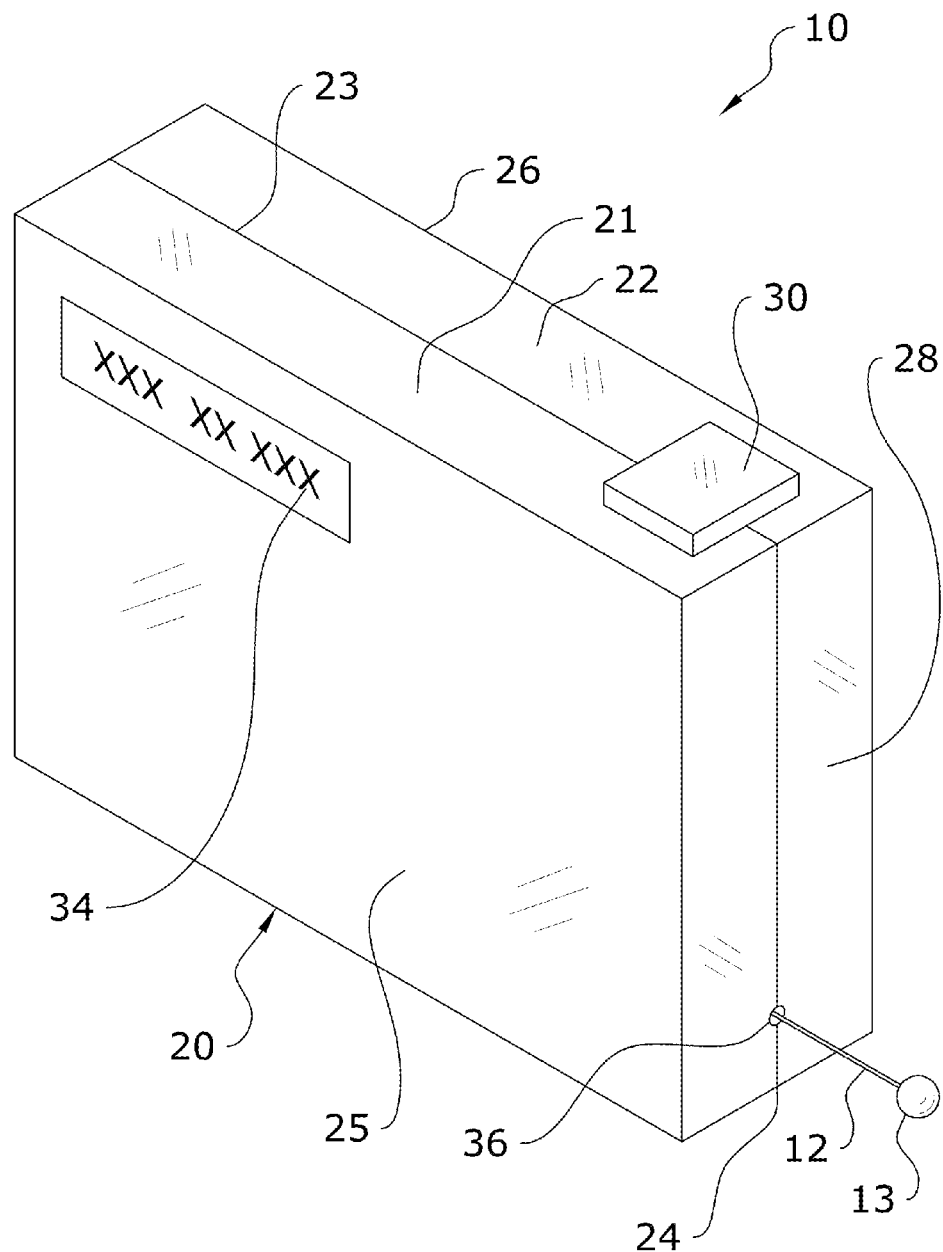
FIG. 1 is a first upper perspective view of the present invention.

Turning now descriptively to the drawings, in which similar reference characters denote similar elements throughout the several views, FIGS. 1 through 4 illustrate a measuring device 10, which comprises a housing 20 which includes a locking member 30, a reel member 40, a sensing assembly and a control unit 60. A length of string 12 is wound around the reel member 40, which is secured within the housing 20 in a manner which allows the string 12 to be retracted around the reel member 40 absent outside force. As the string 12 is dispensed through a string opening 36 on the housing 20, a sensor wheel 50 having a plurality of counting indicia 54 will be rotated underneath one or more sensing members 55, which act to calculate the distance of string 12 which has been dispensed. This data is communicated to a control unit 60, which causes the relevant information to be shown on a display 34 on the housing 20. The locking member 30 may be utilized to stop the string 12 from being dispensed after the requisite length has been dispensed.

B. Housing

The present invention will generally include a housing 20 as shown in FIG. 1. The housing 20 of the present invention will act to store its various components. The housing 20 of the present invention will generally be comprised of a first member 21 and a second member 22, wherein the first member 21 and second member 22 are removably secured or interlocked together to form the housing 20.

Such a configuration allows easy access to the internal components of the present invention for replacement or repair. However, it is appreciated that, in some embodiments of the present invention, the housing 20 may be comprised of a unitary, integral structure. Thus, the present invention should not be construed as being limited to a construction which requires two interlocking members 21, 22 as is shown in the exemplary figures.

Figure 2:
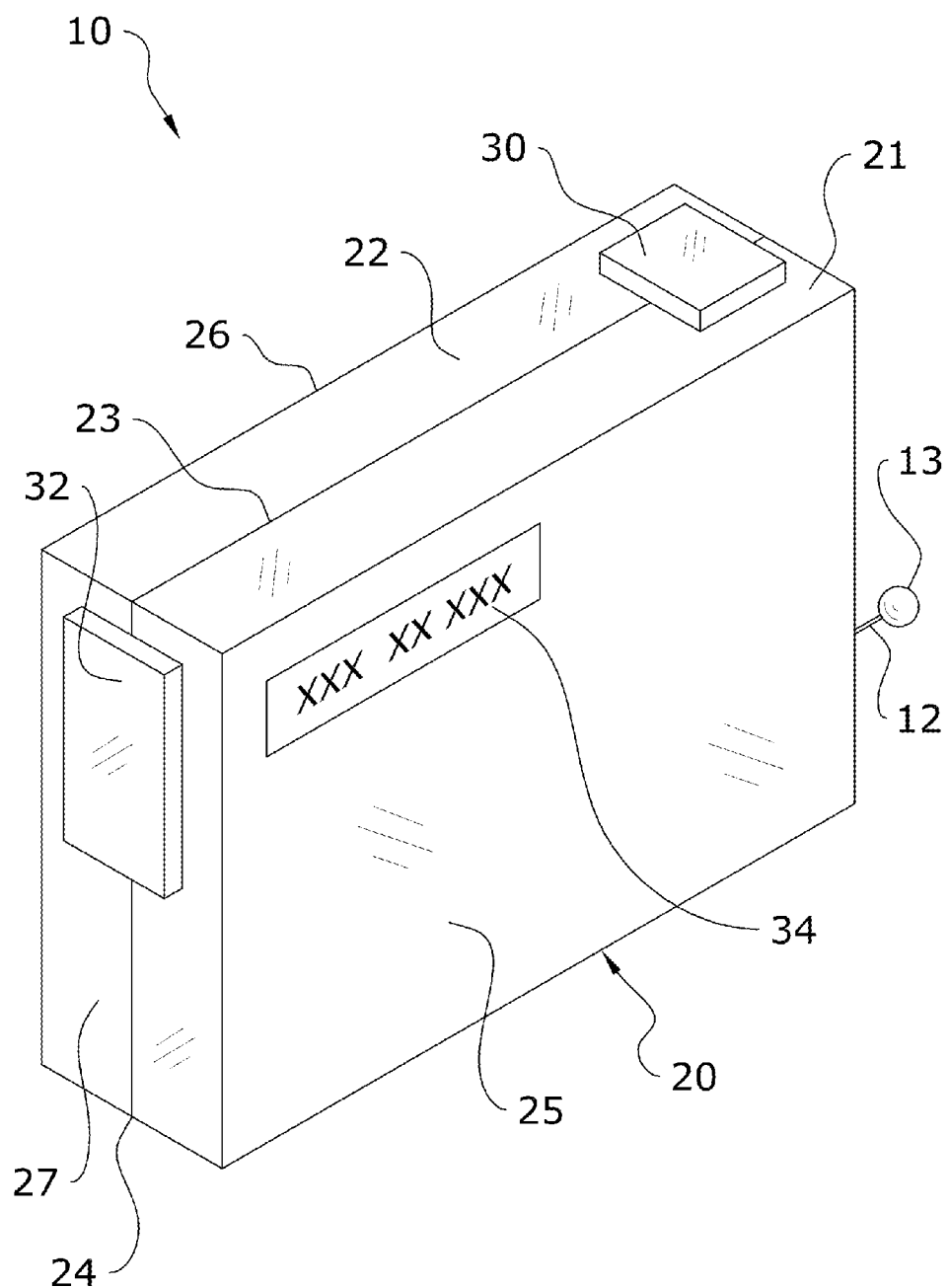
FIG. 2 is a second upper perspective view of the present invention.

The housing 20 of the present invention may be comprised of various shapes and sizes, and should not be construed as being limited to the rectangular configuration shown in the figures. The housing 20 will generally include an upper end 23, a lower end 24, a front portion 25, a rear portion 26, a first side 27 and a second side 28 as shown in FIGS. 1 and 2. In the embodiment shown in the figures, the front portion 25 of the housing 20 is comprised of the first member 21 and the rear portion 26 of the housing 20 is comprised of the second member 22.

The housing 20 will generally include a locking member 30 positioned therein for selectively engaging with and locking the reel member 40 of the present invention as shown in FIG. 2. The locking member 30 will preferably be comprised of a structure which partially extends out of the housing 20 in a manner which allows it to be activated and deactivated while holding the housing 20. In a preferred embodiment, the locking member 30 will extend through an opening on the upper end 23 of the housing 20. However, it is appreciated that the locking member 30 may be positioned at various other locations on the housing 20 so long as it is capable of lockingly engaging with the locking member 30 upon activation.

The housing 20 will also generally include one or more input mechanisms 32 for operating the sensing functions of the present invention. Input mechanisms 32 may be provided which reset the counter, activate the counter, deactivate the counter and the like. Preferably, the input mechanism(s) 32 of the present invention will be comprised of one or more buttons. However, it is appreciated that various other input mechanisms 32 may be utilized, including switches and the like.

While the figures illustrate the use of a single input mechanism 32 positioned on the first side 27 of the housing 20, it is appreciated that various numbers of input mechanisms 32 may be positioned at various other locations on the housing 20. Thus, the positioning and numbering of the input mechanism(s) 32 of the present invention should not be construed as being limited by the figures.

The housing 20 will also generally include a display 34 for indicating the length of string 12 which has been dispensed or various other information (i.e. power on/off, etc.). The display 34 may be positioned at various locations on the housing 20, but will preferably be positioned on its front portion 25 as shown in FIG. 1. The housing 20 may thus include an opening formed therein through which the display 34 may be viewed. Various types of displays 34 may be utilized, including LED, analog, digital and the like. The housing 20 will also generally include a string opening 36 through which the measuring string 12 of the present invention extends. In a preferred embodiment, the string opening 36 will be positioned on the second side 28 of the housing 20 as shown in FIG. 2. However, it is appreciated that the string opening 36 of the present invention may be positioned at various other locations on the housing 20.

C. Reel Member

Figure 3:
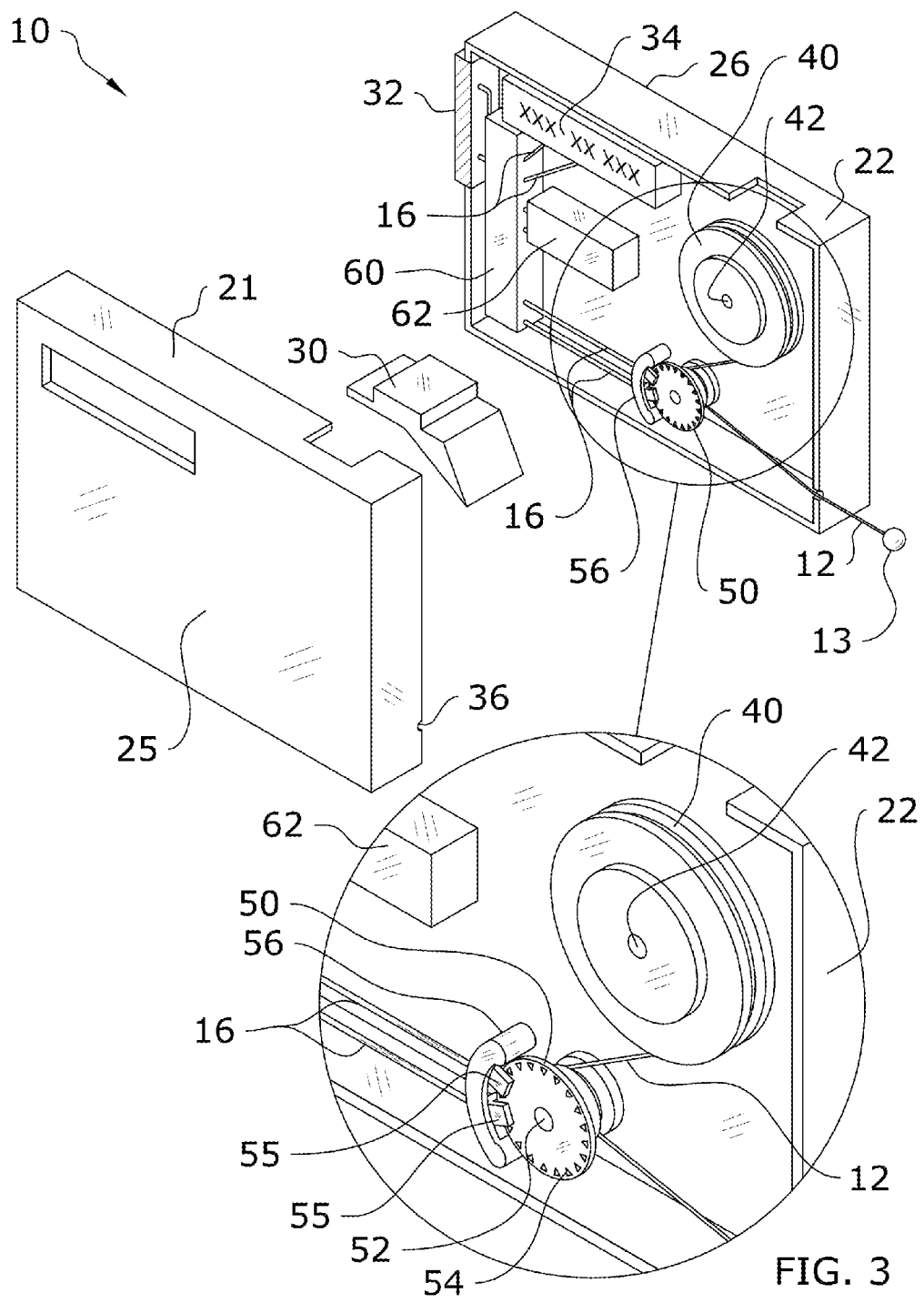
FIG. 3 is an upper perspective exploded view of the present invention.

The present invention will generally include a reel member 40 as shown in FIG. 3. The reel member 40 will generally be comprised of a circular structure around which the string 12 of the present invention is wound. The reel member 40 acts to both dispense and retrieve the string 12 of the present invention when in use.

The reel member 40 will generally be positioned within the housing 20 of the present invention. Preferably, the reel member 40 will be positioned within the housing 20 in a manner which allows the locking member 30 to selectively engage with the reel member 40 to lock the same in place. The reel member 40 is preferably rotatably secured within the housing 20 via an axle 42 as shown in FIG. 3.

The reel member 40 is preferably configured such that, absent application of force, it will act to automatically reel in the string 12 through the string opening 36 of the housing 20 until stopped by the string stopper 13 or engagement of the locking member 30. The reel member 40 will also preferably be configured to allow the string 12 to be freely unwound absent engagement of the locking member 30. Preferably, a retracting element such as a string may be positioned within the reel member 40 to cause the reel member 40 to retract the string 12 absent outside force. Alternatively, a gear attached to a motor could perform the same functionality in alternate embodiments.

D. Sensor Assembly

The present invention includes a sensor assembly for detecting the length of string 12 which has been dispensed through the string opening 36. The sensor assembly of the present invention will generally be comprised of a sensor wheel 50 having a plurality of counting indicia 54 and one or more sensing members 55.

The sensor wheel 50 of the present invention will generally be comprised of a wheel which is rotatably secured within the housing 20 via an axle 52. The sensor wheel 50 and reel member 40 together form a pulley-like system which acts to dispense and retrieve string 12 when the present invention is in use. In a preferred embodiment, the sensor wheel 50 is positioned below and vertically offset with respect to the reel member 40 as shown in FIG. 3.

In some embodiments, the sensor wheel 50 may utilize a groove on its outer circumference through which the string 12 will be fed as shown in FIG. 3. However, other configurations may be utilized without affecting the overall operation of the present invention so long as the string 12 may be wound around the sensor wheel 50 in a manner such that the sensor wheel 50 freely rotates in a first direction when the string 12 is dispensed and freely rotates in a second direction when the string 12 is retrieved The sensor wheel 50 of the present invention will generally include a plurality of counting indicia 54 positioned along its outer radial edge as shown in FIG. 3. The counting indicia 54 will generally be comprised of indicia which are capable of being sensed and counted by the sensing members 55 of the present invention. The counting indicia 54 may be comprised of slots, holes, slits, notches and the like which are formed along the outer rim of the sensor wheel 50 and are detectable by the one or more sensing members 55.

The sensing member(s) 55 of the present invention are utilized to sense the number of counting indicia 54 which pass thereunder. This data is used by the control unit 60 of the present invention to determine the length of string 12 which has been dispensed. The sensing member(s) 55 of the present invention will preferably be comprised of any type of sensor which is capable of detecting and counting the counting indicia 54 as they pass thereunder.

In a preferred embodiment, the sensing assembly will utilize a pair of sensing members 55. A first sensing member 55 is provided which counts the counting indicia 54 on the sensor wheel 50 as it rotates underneath the first sensing member 55. A second sensing member 55 is utilized to determine the direction that the sensor wheel 50 is spinning. In some embodiments, the first and second sensing members 55 may be comprised of the same type of sensor and, in other embodiments, they may be comprised of discrete configurations.

The sensing members 55 of the present invention are generally positioned on a bracket 56 which is secured within the housing 20 in a manner which allows the sensing members 55 to be positioned directly above the radial outer edge of the sensing wheel 50 for detecting the counting indicia 54 as shown in FIG. 3. In some embodiments, a separate bracket 56 may be provided for each of the sensing members 55. In other embodiments, all of the sensing members 55 may be positioned on a single bracket 56.

E. Control Unit

Figure 4:
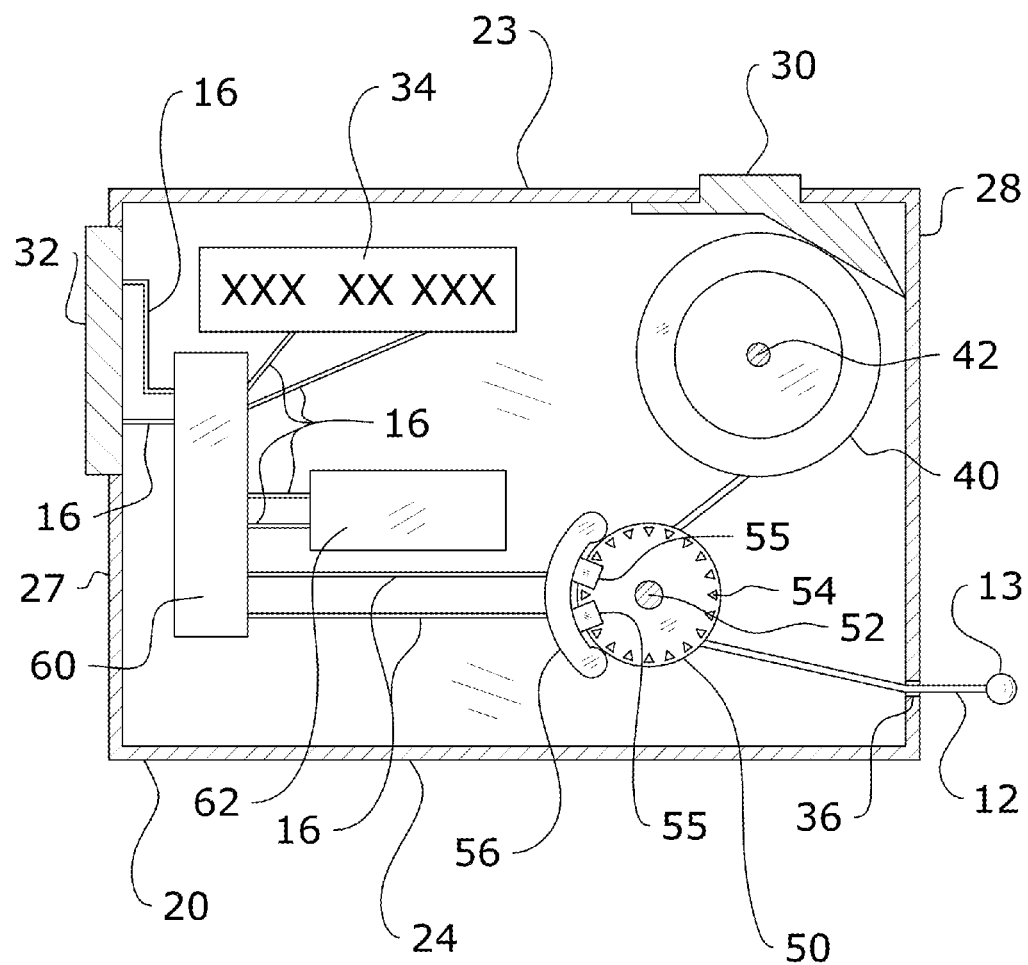
FIG. 4 is a side sectional view of the present invention.

The present invention will generally include a control unit 60 which processes data received from the sensing assembly and causes such data to be shown on a display 34. The control unit 60 will generally be comprised of an integrated circuit board which is communicatively interconnected with the sensing assembly, input mechanism 32, display 34 and power supply 62 of the present invention as shown in FIG. 4. In some embodiments, the control unit 60 may include memory for storage of data, such as flash memory. While the figures illustrate that the various components of the present invention are connected to the control unit 60 via conduit 16, it is appreciated that various other configurations may be utilized.

The control unit 60 will generally be programmed to detect the sensing data from the sensing assembly and cause that data to be displayed on the display 34. The control unit 60 will also act to activate or deactivate the various components of the present invention in response to activation or deactivation of the input mechanism 32.

The control unit 60, display 34 and any other components which necessitate power are generally connected to a power supply 62 as shown in FIG. 4. Various types of power supplies 62 may be utilized with the present invention. In a preferred embodiment, one or more replaceable batteries 62 may be provided. The batteries 62 may be stored within a separate bracket within the housing 20 in some embodiments.

In some embodiments, the housing 20 may include an access panel for replacement of the batteries 62. In other embodiments which do not include such an access panel, the first and second members 21, 22 of the housing 20 may be separated as shown in FIG. 3 to allow access to the batteries 62. It is also appreciated that, in some embodiments, alternate power sources 62 such as solar cells may be utilized.

F. Operation of Preferred Embodiment

In use, the present invention is first turned on by activating the input mechanism 32. An operator of the present invention may then draw the string 12 out of the device. As the string 12 is drawn out through the string opening 36 by the operator of the present invention, the sensor wheel 50 will be turned and the sensing members 55 will act to count the number of counting indicia 54 which pass thereunder. This data is communicated to the control unit 60, which causes the relevant data to be displayed on the display 34.

When the string 12 is at the desired length, the operator of the present invention may then lock the string 12 at its desired length using the locking member 30 and the specific distance may be saved by the control unit 60 and stored in memory after activation of a corresponding input mechanism 32. The locking member 30 may then be released and the reel member 40 will act to retract the string 12 back into the housing and over the sensor wheel 50 before being wound around the reel member 40 for future use. The sensing assembly will detect that the string 12 is being retracted and communicate that the string 12 is returned to the control unit 60. The operator of the present invention may then view the measured distance on the display 34. Measured distances may be stored in memory for future retrieval and use. The values may be reset by activation of an input mechanism 32 and the steps may then be repeated for additional measurements.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A measuring device, comprising:
a housing;
a string opening positioned on said housing;
a reel member rotatably positioned within said housing, wherein a length of string is wound around said reel member and wherein a first end of said string is fixedly secured to said reel member, wherein a second end of said string extends through said string opening;
a sensor wheel rotatably positioned within said housing, wherein said length of string extends partially around said sensor wheel;
a plurality of counting indicia positioned on said sensor wheel;
at least one sensing member positioned above said sensor wheel for sensing the number of said counting indicia which have passed thereunder;
a control unit, wherein said control unit is adapted to receive said number of said counting indicia from said at least one sensing member and calculate a length of dispensed string;
memory connected to said control unit;
a display connected to and positioned within said housing and connected to said control unit;
a power source positioned within said housing and electrically connected to said control unit, said memory and said display so as to power said control unit, said memory and said display;
wherein when string is dispensed, the length dispensed string is displayed on said display;
wherein when string is dispensed, the length of dispensed string is stored in said memory for future retrieval and use;
at least one input mechanism connected to said housing and said control unit;
wherein said input mechanism selectively resets a counter of said control unit to calculate a length of dispensed string, and selectively activates and deactivates a counter of said control unit to calculate a length of dispensed string.

2. The measuring device of claim 1, wherein said housing is comprised of a first member and a second member, wherein said first member is removably secured to said second member.

3. The measuring device of claim 1, wherein said string includes a string stopper positioned at said second end.

4. The measuring device of claim 1, wherein said at least one sensing member is comprised of a first sensing member for counting said counting indicia and a second sensing member for determining a rotational direction of said sensor wheel.

5. The measuring device of claim 1, further comprising a bracket positioned within said housing, wherein said at least one sensing member is secured to said bracket.

6. The measuring device of claim 1, further comprising an input mechanism positioned on said housing for activating and deactivating the device.

7. The measuring device of claim 1, wherein said reel member includes an axle.

8. The measuring device of claim 1, wherein said plurality of counting indicia is comprised of slits formed on an outer radial edge of said sensor wheel.

9. A measuring device, comprising:
- a housing, wherein said housing includes a string opening;
- a reel member rotatably positioned within said housing;
- a sensor wheel rotatably positioned within said housing;
- a string, wherein a first end of said string is fixedly secured to said reel member, wherein said string extends around said sensor wheel and wherein a second end of said string extends out of said string opening;
- a plurality of counting indicia positioned on said sensor wheel;
- a first sensing member positioned above said sensor wheel for sensing the number of said counting indicia which have passed thereunder;
- a second sensing member positioned above said sensor wheel for sensing the direction of rotation of said sensor wheel;
- a control unit, wherein said control unit is adapted to receive said number of said counting indicia from said first sensing member and calculate a length of dispensed string;
- memory connected to said control unit;
- a display connected to and positioned within said housing and connected to said control unit;
- a power source positioned within said housing and electrically connected to said control unit, said memory and said display so as to power said control unit, said memory and said display;
- wherein when string is dispensed, the length of dispensed string is displayed on said display;
- wherein when string is dispensed, the length of dispensed string is stored in said memory for future retrieval and use;
- at least one input mechanism connected to said housing and said control unit;
- wherein said input mechanism selectively resets a counter of said control unit to calculate a length of dispensed string, and selectively activates and deactivates a counter of said control unit to calculate a length of dispensed string.

10. The measuring device of claim 9, wherein said housing is comprised of a first member and a second member, wherein said first member is removably secured to said second member.

11. The measuring device of claim 9, wherein said string includes a string stopper positioned at said second end.

12. The measuring device of claim 9, further comprising a first bracket positioned within said housing, wherein said first sensing member is secured to said first bracket.

13. The measuring device of claim 12, further comprising a second bracket positioned within said housing, wherein said second sensing member is secured to said second bracket.

14. The measuring device of claim 9, further comprising an input mechanism positioned on said housing for activating and deactivating the device.

15. The measuring device of claim 9, wherein said power source is comprised of at least one battery.

16. A measuring device, comprising:
- a housing, wherein said housing includes a string opening, wherein said housing is comprised of a first member and a second member, wherein said first member is removably secured to said second member;
- an input mechanism positioned on said housing;
- a reel member rotatably positioned within said housing;
- a sensor wheel rotatably positioned within said housing;
- a string, wherein a first end of said string is fixedly secured to said reel member, wherein said string extends around said sensor wheel and wherein a second end of said string extends out of said string opening, wherein said string includes a string stopper positioned at said second end;
- a plurality of counting indicia positioned on said sensor wheel;
- a first sensing member positioned above said sensor wheel for sensing the number of said counting indicia which have passed thereunder a second sensing member positioned above said sensor wheel for sensing the direction of rotation of said sensor wheel;
- a control unit, wherein said control unit is adapted to receive said number of said counting indicia from said first sensing member and calculate a length of dispensed string;
- a power source positioned within said housing;
- memory connected to said control unit;
- a display connected to and positioned within said housing and connected to said control unit;
- a power source positioned within said housing and electrically connected to said control unit, said memory and said display so as to power said control unit, said memory and said display;
- wherein when string is dispensed, the length of dispensed string is displayed on said display;
- wherein when string is dispensed, the length of dispensed string is stored in said memory for future retrieval and use;
- at least one input mechanism connected to said housing and said control unit;
- wherein said input mechanism selectively resets a counter of said control unit to calculate a length of dispensed string, selectively activates and deactivates a counter of said control unit to calculate a length of dispensed string.

* * * * *

UNITED STATES PATENT AND TRADEMARK OFFICE
CERTIFICATE OF CORRECTION

PATENT NO. : 8,739,426 B1
APPLICATION NO. : 13/323036
DATED : June 3, 2014
INVENTOR(S) : Jeffory D. Freed et al.

Page 1 of 1

It is certified that error appears in the above-identified patent and that said Letters Patent is hereby corrected as shown below:

In the Claims

Column 6, line 48, Claim 1, after the word "length" insert --of--.

Signed and Sealed this
Fifth Day of August, 2014

Michelle K. Lee
*Deputy Director of the United States Patent and Trademark Office*